United States Patent [19]
Miller

[11] 3,785,7
[45] Jan. 15, 19

[54] FILM CARTRIDGE

[75] Inventor: Stephen H. Miller, Rochester, N.Y.

[73] Assignee: Eastman Kodak Company, Rochester, N.Y.

[22] Filed: Apr. 28, 1972

[21] Appl. No.: 248,514

[52] U.S. Cl. ................ 352/78 R, 242/197, 352/29
[51] Int. Cl. ........................................ G03b 23/02
[58] Field of Search ................. 352/72, 78, 159, 352/26, 29; 242/195, 197, 198

[56] References Cited
UNITED STATES PATENTS

| | | | |
|---|---|---|---|
| 3,662,972 | 5/1972 | Egan | 242/197 |
| 3,695,160 | 10/1972 | Stockdale | 95/31 CA |
| 3,582,014 | 6/1971 | Jorgensen | 242/195 |
| 3,442,580 | 5/1969 | Winkler | 352/29 |
| 3,655,145 | 4/1972 | Olsen | 242/197 |

*Primary Examiner*—Samuel S. Matthews
*Assistant Examiner*—Alan Mathews

[57] ABSTRACT

A cartridge is adapted to handle a length of film or other strip material wherein the material has a portion with an opening therein between the side edges of the material and preferably near the trailing end portion of the strip. In the preferred embodiment described the cartridge is loaded with motion picture film to exposed in a camera and includes two openings or ertures for receiving camera apparatus adapted to vance film through the cartridge. One of the apertu receives a film pull-down claw in a camera, the c being effective to intermittently advance film past exposure aperture in the cartridge. The other oper or aperture receives a capstan, for example, whic adapted to continuously advance film past a sou head in the camera for recording of sound onto film during a filming sequence. During the nor filming sequences the film is advanced by the claw the capstan along a first curved path through the c tridge between the two apertures and, when the enc the film is reached by the film pull-down claw and i ineffective to further pull film past the exposure ap ture, the film then is advanced along a second p through the cartridge by the capstan only. A s member in the form of a finger is provided in the c tridge along the second path and is positioned so t the finger can enter the opening in the film and be gaged by an edge of the opening, thereby securing film against further advancement along the sec path and through the cartridge by the capstan. T prevents advancement of the trailing end portion the film completely past the apertures and into take-up chamber of the cartridge, thereby permitt film to be extracted from the cartridge for process by grasping the trailing end portion of the film and vancing it through the exposure aperture.

2 Claims, 7 Drawing Figures

1

FILM CARTRIDGE

CROSS-REFERENCES TO RELATED APPLICATIONS

Reference is made to commonly assigned copending U.S. Patent Application Ser. No. 63,879, entitled FILM CARTRIDGE FOR PREVENTING THE END OF A FILM STRIP FROM ENTERING A CARTRIDGE CHAMBER, filed Aug. 14, 1970 in the name of W. L. Stockdale, now U.S. Pat. No. 3,695,160, issued Oct. 3, 1972.

BACKGROUND OF THE INVENTION

1. Field Of The Invention

This invention relates to cartridges or cassettes of the type adapted to receive and handle an elongate strip of web material and, more specifically, the invention relates to a film cartridge adapted to be positioned in a camera for exposure of the film to scene light and simultaneously for recording of sound onto the film.

2. Description Of The Prior Art

Film cartridges are well known, including the so-called "super 8" film cartridge which is adapted to receive a roll of unexposed eight millimeter film and which is positionable in a camera for advancement of the film by a claw or other drive member in the camera to sequentially expose portions of the film strip to scene light. Cartridges of the super 8 type are disclosed in commonly assigned U. S. Pat. No. 3,208,685 issued to E. A. Edwards et al on Sept. 28, 1965 and entitled, "Anti-Friction Disc for Strip Material Cartridge" and U. S. Pat. No. 3,208,686 issued to E. A. Edwards et al on Sept. 28, 1965 entitled, "Film Cartridge."

It also is known to modify such super 8 film cartridges to provide for sound recording on the film in the cartridge, such being disclosed in U. S. Pat. No. 3,442,580 issued to A. Winkler on May 6, 1969 and entitled, "Motion Picture Camera or Projector for Film with Sound Track." As disclosed in the latter patent, an intermittent film pull-down mechanism advances film in a frame-by-frame manner past an exposure aperture in the camera, and a capstan drive continuously advances film past a sound recording head spaced from the exposure aperture. The latter patent also discloses detent means that are engageable with the film any time it is taken out of a camera to hold the film against movement through the cartridge. However, this detent means does not prevent or stop advancement of the film by the capstan drive when all of the usable film has been exposed at the exposure aperture. As a result, the trailing end portion of the film can be advanced into the take-up chamber of the cartridge by the capstan and a drive coupled to the film take-up. This requires that the film cartridge be cut open for removal of exposed film from the take-up chamber prior to processing of the exposed film. While this film-removal method is satisfactory, it is sometimes desirable to extract film from the film cartridge through the exposure aperture for film processing. For example, removal of film through the exposure aperture is desirable when the film is to be processed in apparatus of the type disclosed in commonly assigned copending U.S. Patent Application Ser. No. 126,979, filed Mar. 22, 1971 in the names of Cumbo et al and entitled "Film Processing Apparatus." In order to extract film through the exposure aperture the anti-backup mechanism commonly utilized in super 8 film cartridges for preventing clock-springing of film in the cartridge must be disengaged, and such can be effected in the manner disclosed in commonly assigned U.S. Pat. No. 3,550,877 issued to R. C. Sutliff et al on December 29, 1970 and entitled "Cartridge and Method for Removing Film from a Cartridge," or in the manner disclosed in the copending U.S. Patent Application Ser. No. 229,924, filed Feb. 28, 1972 in the name of Archie J. Tucker, entitled "Disengageable Anti-Backup Device for Film Cartridge", refiled on Jan. 12, 1973 as Continuation-in-Part patent application Ser. No. 323,019.

In film cartridges as disclosed in the aforementioned Edwards et al patents provision is not made for a capstan drive as well as a pull down claw. In such cartridges the trailing end portion of the film remains accessible at the exposure aperture after all usable film has been exposed due to a cut-out provided in the trailing end portion of the film in the area at the side of the film where perforations normally exist so that when the film claw reaches the cut-out portion of the film it is no longer effective to advance the film and the trailing end of the film remains in the exposure aperture even though the claw may continue to operate. While this is satisfactory for stopping film in the exposure aperture for such cartridges, it is not satisfactory for cartridges of the type disclosed in the before-mentioned U.S. Pat. No. 3,442,580 since continued operation of the camera causes film to be advanced by the capstan drive mechanism, thereby pulling the end of the film past the exposure aperture and permitting it to be taken up into the take-up side of the cartridge. The present invention prevents advancement of the trailing end of the film into the take-up chamber of the cartridge of a sound film cartridge where the film is advanced by a continuously operated capstan drive between the claw and the take-up side of the cartridge.

In the before-mentioned commonly assigned copending U.S. Patent Application Ser. No. 63,879, filed Aug. 14, 1970 in the name of W. L. Stockdale and entitled "Film Cartridge for Preventing the End of a Film Strip from Entering a Cartridge Chamber," a projection is disclosed for engaging an opening in the film strip to stop the film before the trailing end thereof is wound completely into the take-up chamber of a cartridge of the type having spaced supply and take-up compartments interconnected by a wall, such being commonly used for "still" or photographic cameras. In this type of cartridge, however, film is not subjected to the continuous driving force of a capstan or the like which continues to drive film away from the exposure aperture after all of the usable film has been exposed. Other prior patents of interest include U.S. Pat. Nos. 2,559,892 to Mihalyi et al.; 2,409,605 to Bolsey; and 2,629,302 to Mihalyi.

SUMMARY OF THE INVENTION

Among the objects of the present invention, is the provision of a strip handling device, such as a film cartridge of the type described, which is adapted to be advanced by two separate drive members and wherein provision is made for stopping the strip with one end portion thereof in a predetermined position.

Another object of the invention is to provide an improved film cartridge, such as a super 8 film cartridge wherein apertures are provided for a film claw for intermittently advancing the film through one portion of the cartridge and wherein an aperture is provided for a constant drive mechanism for continuously advancing the film past another portion of the cartridge, and wherein provision is made for stopping movement of the film by the constant film drive at a particular time so that a portion of the film strip remains exposed at one of the apertures, thereby to facilitate withdrawal of film through that aperture for processing of the film or for other reasons.

The present invention relates to a cartridge for handling a length of flexible strip material (such as film) wherein the material has a portion with an opening therein between side edges of the material. The cartridge is usable with apparatus engageable with the material in the cartridge through cartridge apertures positioned at two spaced locations for advancing the material through the cartridge. Means are provided in the cartridge defining a first path and a second path for strip material through the cartridge between said apertures. Projecting stop means on the cartridge is located along the second path and in spaced relation to the first path so that the strip material is engageable with the projecting means when the strip material is advanced along the second path. The stop means is positioned relative to the side edges of the strip material as it advances along the second path and has a width relative to the opening in the strip material so that when the opening in the strip material is moved along the second path the stop means can enter the opening and be engaged by an edge of the opening. This secures the strip material against further advancement along the second path.

BRIEF DESCRIPTIONS OF THE DRAWINGS

The above and other objects and advantages of the present invention will become apparent to one skilled in the art from the following detailed description read in conjunction with the attached drawings wherein like reference numerals indicate like elements and wherein.

DESCRIPTION OF THE PREFERRED EMBODIMENT

Because photographic apparatus are well known, the present description will be directed in particular to elements forming part of, or cooperating more directly with, the present invention, apparatus not specifically shown or described herein being understood to be selectable from those known in the art.

Figure 2:
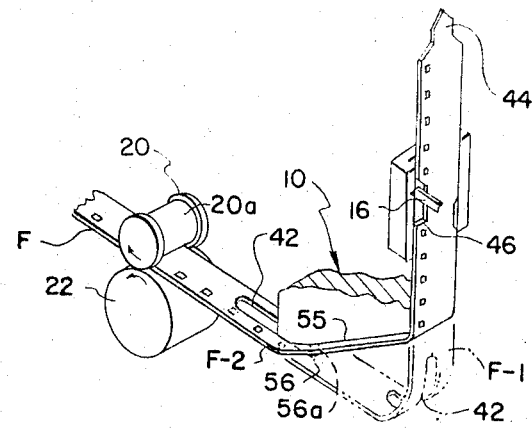
FIG. 2 is a fragmentary perspective of portions of the cartridge illustrated in FIG. 1 showing the intermittent and constant speed film drives of the camera and illustrating two paths for film between such drives.
Figure 3:
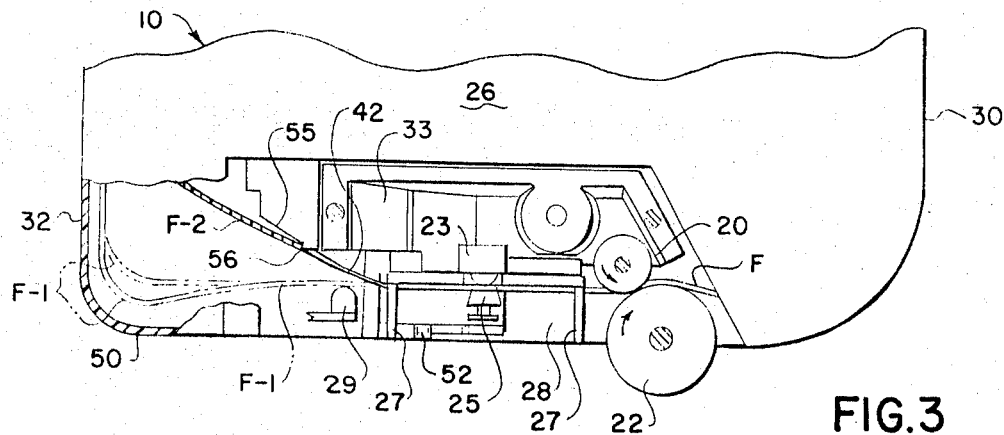
FIG. 3 is a fragmentary view of the lower portion of the cartridge shown in FIG. 1 showing certain portions of camera mechanisms relative to the cartridge and film and illustrating two different film paths through the lower portion of the cartridge.

Referring now to the drawings, a cartridge incorporating features of the invention is generally designated 10 and is adapted to be received in a cartridge compartment or chamber 12 provided in a suitable camera, a portion of which is shown generally at 14. The camera is provided with a suitable film advancing member, such as the claw 16 (FIG. 2) which is driven in a generally rectilinear path for intermittently advancing film past an exposure aperture (not shown) in the camera. In the lower wall 18 of the cartridge compartment 12 an opening 19 is provided to admit certain portions of camera apparatus used for effecting sound recording on the film F in the cartridge as it is being exposed to scene light in the camera. This apparatus can include a capstan 20 having a wide groove 20a which receives the film. A movable pressure roller 22 is urged against the capstan so that rotation of the capstan in the direction shown in FIGS. 2 and 3 effects rotation of the roller. The axes of rotation of the capstan and roller are located relative to each other and to the film path across a cartridge aperture 24 so that a line connecting the axes is disposed at approximately 30° to a second line that is perpendicular to the film path across aperture 24 and passes through either axis. As shown in FIG. 3, the film engages a segment of the surface of roller 22 so that when the roller is rotated by the capstan the film is advanced from the exposure aperture past a sound head or transducer 23 (FIGS. 3 and 4) positioned between the capstan and the exposure aperture. A movable pressure member 25 (FIG. 3) urges the film sound track against the sound head, and a pair of spaced movable film guides 27 at opposite sides of the sound head guide the film between the sound head and member 25. A movable loop sensor 29 can engage the loop of film between the exposure aperture and the sound head, thereby sensing the length of film therebetween. Normally, there should be eighteen frames separation between the exposure aperture and the sound head. The loop sensor can be connected to suitable means (not shown) to control the film claw so that the desired separation is maintained within acceptable limits. The camera sound apparatus comprising roller 22, pressure member 25, film guides 27 and sensor 29 are movable by means (not shown) between the position shown in FIG. 3 wherein they are located for recording of sound onto the film and another position shown in FIG. 4 wherein they are retracted beneath wall 18 of the cartridge chamber to facilitate loading and unloading of a cartridge into the camera.

Figure 1:
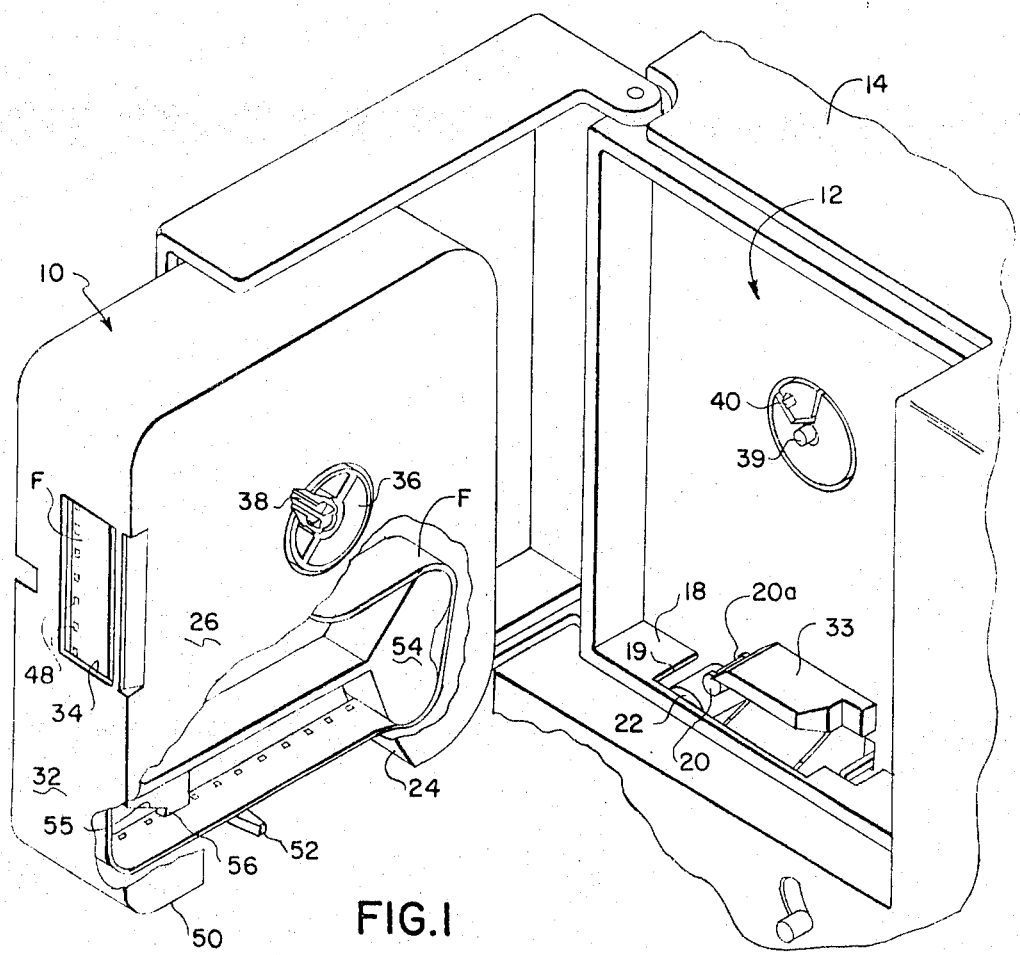
FIG. 1 is a perspective view of a film cartridge of the invention and illustrates a portion of a motion picture camera adapted to receive the cartridge.
Figure 5:
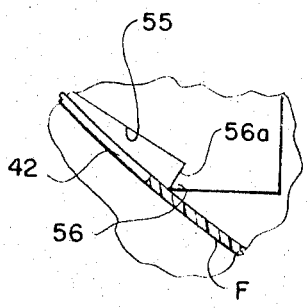
FIG. 5 is an enlarged fragmentary view illustrating the member for stopping the film in the cartridge.

The sound apparatus is received in an aperture 24 in one side 26 and the lower end of the cartridge, the other side 28 and the ends 30 and 32 of the cartridge being substantially closed so that other parts of the cartridge are light-tight. A shroud 33 is shown in the chamber 12 in the camera. The shroud enters aperture 24 as the cartridge is loaded into the camera and facilitates accurate positioning of the film relative to the camera sound apparatus. Wall 28 of the cartridge and end walls 30 and 32 extend below the aperture 24. As shown in FIG. 1, end wall 32 of the cartridge has an exposure aperture 34 therein through which the film is exposed to scene light. The portion of the cartridge above aperture 24 is preferably substantially the same as the film cartridge disclosed in the beforementioned Edwards et al. U.S. Pat. Nos. 3,208,685 and 3,208,686, the disclosure of such patents being incorporated herein by this reference.

After the film passes the capstan 20 it is wound onto a take-up core 36 (FIG. 1) in the take-up chamber of the cartridge. As is well known in the art, the take-up core 36 preferably operates in connection with a suitable anti-backup device to prevent clockspringing of the film roll in the cartridge. For a sound cartridge of the type disclosed herein it is preferred that the anti-backup mechanism be disengageable to eliminate any "clicking" noise that may be associated with operation of such a device. The anti-backup mechanism is preferably of the type disclosed in the beforementioned copending patent application filed in the name of Archie J. Tucker and entitled "Disengageable Anti-Backup Device for Film Cartridge," a portion of which is illustrated at 38 in FIG. 1. The anti-backup mechanism may be disengaged automatically by a pin 39 in the camera. The take-up core 36 is driven through a friction clutch by a suitable drive member 40 on the inner wall of the cartridge compartment 12 of the camera.

Figure 6:
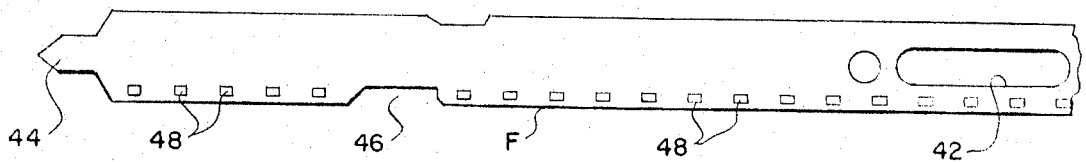
FIG. 6 is a view of the trailing end portion of a film strip such as can be used in the cartridge of the invention.

Referring now to FIG. 6 of the drawings, U.S. Pat. No. 3,208,685 referred to hereinbefore discloses an elongate slot or opening 42 located in the trailing end portion of the film strip F and adapted to cooperate with a pointed end 44 of the film strip to form the inner convolution of the supply roll of film in the cartridge and to minimize any tendency of the inner convolution of the film roll to cinch on the boss provided for the film supply roll to the supply chamber of the cartridge. It is also known to provide a cut-out as shown at 46 along the edge of the film containing perforations 48 so that when the trailing end portion of the film reaches the film aperture 34 in the film cartridge, claw 16 simply travels through the cut-out 46 (as shown in FIG. 2) and therefore is unable to further advance film through the cartridge. As a result, in cartridges such as shown in the beforementioned Edwards et al. patents, the trailing end portion of the film remains accessible at the exposure aperture so that it can be stripped from the film cartridge for processing, etc. as referred to hereinbefore. However, in a sound type film cartridge, continued operation of the camera mechanisms will effect advancement of film through the exposure aperture due to the film drive provided by the capstan 20 and pressure roller 22. In accordance with the present invention, stop means provided in the cartridge cooperate with the slot or opening 42 in the film to stop the film before the trailing portion thereof is advanced through the exposure aperture by the capstan drive.

Referring now to FIGS. 2–5, the cartridge includes means defining a first curved path for film between the exposure aperture and the capstan drive and a second curved film path between the exposure aperture and the capstan drive. In FIGS. 2 and 3, the first film path is illustrated in phantom and is designated F-1. It extends along the inner surface of wall 32 of the cartridge to the lower end of the wall and then extends to the right along or above a film guide portion 50 of the cartridge and inside of a finger 52 that projects upwardly from wall 28 across the opening defined by recess 24. When the cartridge is loaded in the camera and the camera sound apparatus is engaged for filming and sound recording operations, film path F-1 extends over film loop sensor 29 and one guide 27, pressure member 25 and roller 22 as shown in FIG. 3. After the film leaves the capstan drive it passes through a light-tight opening in the cartridge, around a heart-shaped film snubber 54, and then onto the roll of film wound around the film take-up core 36. As shown in the corner of the cartridge at the bottom of edge wall 32, the film path F-1 comprises a range of paths or positions, two of which are illustrated by way of example. This portion of the film path varies in operation due to the intermittent movement of film at the exposure aperture effected by claw 16 and the continuous movement of the film at aperture 24 effected by the capstan drive 20. As noted earlier, the size of this loop can be sensed by a sensor 29 and operation of the film claw regulated (either by an on-off type operation or by varying the speed of operation of the film pull-down claw) so that the loop is maintained within a given range of acceptable sizes which permit the capstan to operate continuously, thereby assuring high fidelity recording of sound on film.

The second film path is designated F-2 in FIGS. 2 and 3 and is defined by the surface 55 of a wall portion of the film cartridge spaced from the inner surface of end wall 32 and the wall 50 at the cartridge. The second film path is shorter than the first film path. During operation of the camera the film typically travels along path F-2 only when the film claw 16 encounters the cut-out portion 46 of the film strip and when the capstan 20 continues to advance film through the sound aperture 24 of the cartridge.

Figure 7:
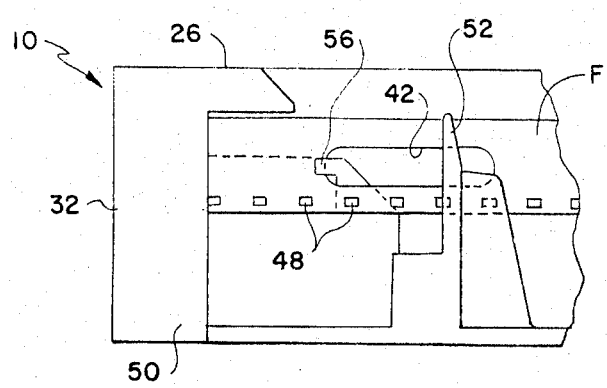
FIG. 7 is a fragmentary view from the bottom of the cartridge showing the stop member.

In order to stop the film when it travels along film path F-2, stop means in the form of a finger 56 in the cartridge projects into path F-2. The finger is positioned laterally between the cartridge walls 26 and 28 so that it will be aligned with the opening 42 in the film as the film is advanced along path F-2 by the capstan. The finger 56 projects toward film path F-1 and generally toward the corner of the cartridge defined by the end wall 32 and by the bottom or open side of the cartridge. As shown in FIG. 7, the finger 56 is narrower than the width of the opening 42 in the film strip, and is not sharp along the leading surface 56a (FIG. 5) thereof to minimize the possibility of tearing of the film strip. Also, the finger projects far enough below the wall 55 of the cartridge so that it is in line with film path F-2 so that opening 42 is brought into engagement with the finger by operation of the capstan. However, the finger is spaced from path F-1 so that it is not engaged by the film during filming operations, thereby avoiding possible scratching of the film.

Once the cartridge is loaded into the camera and the camera sound apparatus engaged as shown in FIG. 3, the film is advanced through the cartridge in the manner explained hereinbefore during normal filming operations so that the film typically occupies the film path F-1. At this time film is simultaneously being advanced intermittently by the pull-down claw 16 and in a continuous manner by the capstan 20 and the pressure roller 22. When the useful portion of the film has been exposed in the exposure aperture, the film claw 16 encounters the cut-out portion 46 of the film and intermittent advance of film by the claw is terminated. Continued operation of the capstan 20 brings the film from the path F-1 into the path F-2 and then begins to effect movement of the film to the right as viewed in FIG. 3. This rapidly brings the slot 42 in the film strip to the finger 56 and results in the finger projecting through that aperture so that the surface 56a of the finger is then engaged by the left edge of the slot (as viewed in FIG. 6), thereby securing the strip material against further advancement along the film path F-2 by the capstan drive.

Figure 4:
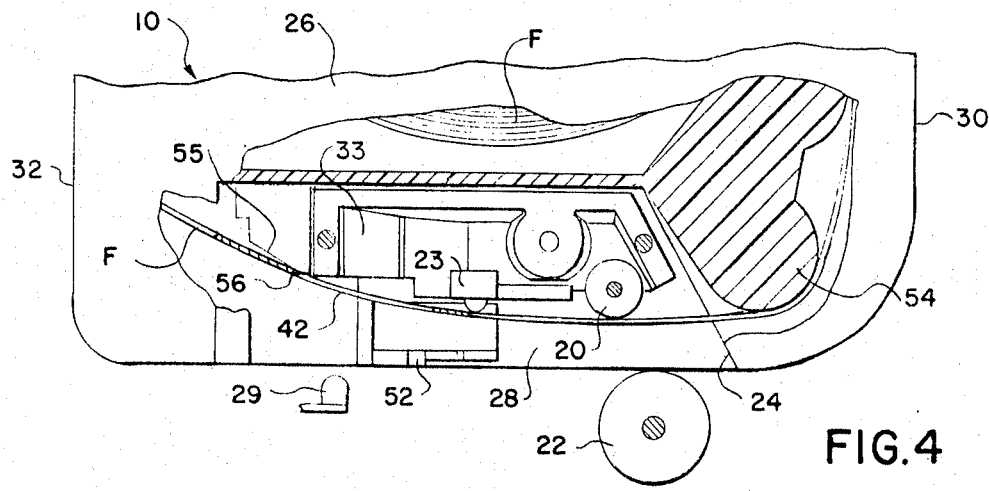
FIG. 4 is a view similar to FIG. 3 but showing the camera mechanisms retracted so the cartridge can be withdrawn from the camera and showing the film engaged by the cartridge stop means.

The camera sound apparatus is then disengaged from the film and portions thereof are retracted through opening 19 in camera wall 18 so that the cartridge can be easily withdrawn from cartridge compartment 12. This is illustrated in FIG. 4. The slight slack or looseness in the film between finger 56 and snubber 54 results from release of the camera sound apparatus below the film. The film may remain engaged with finger 56 or be released therefrom at that time since there is no longer any drive acting on the film to advance it through the cartridge. When the cartridge is removed from the camera the anti-backing mechanism for core 36 and the pressure on the film at aperture 34 normally are sufficient to prevent accidental movement of film in the cartridge until it reaches the processing laboratory.

The invention has been described in detail with particular reference to preferred embodiments thereof, but it will be understood that variations and modifications can be effected within the spirit and scope of the invention.

I claim:

1. In a cartridge for handling a length of flexible strip material wherein the material has a portion with an opening therein between side edges of the material, the cartridge comprising two adjacent walls having a corner therebetween, a first aperture located in one of said adjacent walls, a second aperture located in the other of said adjacent walls, the first aperture being spaced from the second aperture, and the cartridge being usable with apparatus having means engageable with the material in the cartridge through the apertures for advancing the material through the cartridge from the first aperture toward the second aperture, the improvement comprising:
   means in the cartridge between the apertures defining a space through which strip material is advanced from the first aperture toward the second aperture along a first curved path, means in said space defining a second curved path spaced from the first path and along which the strip material is advanced, the space defining means comprising spaced surfaces at said corner of the cartridge, said second curved path defining means comprising one of said surfaces; and
   projecting stop means carried by one of said surfaces and located along the second path in spaced relation to the first path so that the strip material is engageable with the stop means when the strip material is advanced along the second path, said stop means comprising a finger projecting from said one of said surfaces toward said corner, the finger being narrower than the second path and being positioned relative to the second path so that when the opening in the strip material is moved along the second path the finger can enter the opening and be engaged by an edge of the opening, thereby securing the strip material against further advancement along the second path.

2. In a cartridge for handling a length of flexible film having a trailing end portion with an opening therein between side edges of the film, the film having perforations along one side edge thereof and having a cut-out in said side edge of said one end portion, the cartridge comprising two adjacent walls having a corner therebetween, a first aperture located in one of said adjacent walls through which film in the cartridge can be exposed to scene light, a second aperture located in the other of said adjacent walls, the first aperture being spaced from the second aperture, and the cartridge being usable in a camera having (1) a claw engageable with film in the cartridge through the first aperture for intermittently advancing the film past the first aperture and toward the second aperture and (2) a film drive engageable with the film through the second aperture for continuously advancing film in the cartridge, the claw being ineffective to advance film in the cartridge when the cut-out in the film reaches the first aperture, the improvement comprising:
   means at said corner of the cartridge defining a space between the apertures through which film is advanced from the first aperture toward the second aperture along a first curved path, means in said space defining a second curved path that is shorter than the first path and along which the strip material is advanced, the space defining means comprising spaced surfaces at said corner of the cartridge, said second curved path defining means comprising one of said surfaces; and
   a finger projecting from one of said surfaces toward said corner and located along the second path in spaced relation to the first path so that the film is engageable with the finger only when the film is advanced along the second path, said finger (1) being positioned relative to the side edges of the film as it advances along the second path and (2) having a width relative to the opening in the film so that when the opening in the film is moved along the second path the finger can enter the opening and be engaged by an edge of the opening, thereby securing the film against further advancement along the second path.

* * * * *